US006952092B2

(12) United States Patent
Wood

(10) Patent No.: US 6,952,092 B2
(45) Date of Patent: Oct. 4, 2005

(54) WATT POWER DEVICE

(76) Inventor: Sylvester Wood, 504 W. Main St., Weatherly, PA (US) 18225

(*) Notice: Subject to any disclaimer, the term of this patent is extended or adjusted under 35 U.S.C. 154(b) by 143 days.

(21) Appl. No.: 10/604,047

(22) Filed: Jun. 24, 2003

(65) Prior Publication Data

US 2004/0263138 A1 Dec. 30, 2004

(51) Int. Cl.[7] .............................. H02J 1/00; H02B 1/24
(52) U.S. Cl. ....................... 323/323; 323/207; 307/127; 324/142
(58) Field of Search ................................ 323/222, 207, 323/323, 215, 217, 212; 363/16, 20, 34; 307/44, 46, 49, 127, 48; 324/142, 143, 156, 157; 320/150, 125

(56) References Cited

U.S. PATENT DOCUMENTS

| | | | | |
|---|---|---|---|---|
| 3,319,074 A | | 5/1967 | Koch | |
| 4,206,367 A | | 6/1980 | Petruska et al. | |
| 4,839,787 A | * | 6/1989 | Kojima et al. | 363/60 |
| 5,319,300 A | | 6/1994 | Wood | |
| 5,546,044 A | * | 8/1996 | Calligaro et al. | 327/543 |
| 5,637,989 A | | 6/1997 | Wood | |
| 5,670,864 A | * | 9/1997 | Marx et al. | 323/211 |
| 5,754,036 A | | 5/1998 | Walker | |
| 5,889,428 A | * | 3/1999 | Young | 327/536 |
| 5,925,998 A | | 7/1999 | Olson | |
| 6,215,203 B1 | | 4/2001 | Wood | |
| 6,316,917 B1 | * | 11/2001 | Ohta | 320/166 |
| 6,362,604 B1 | * | 3/2002 | Cravey | 323/241 |

* cited by examiner

*Primary Examiner*—Rajnikant B. Patel
(74) *Attorney, Agent, or Firm*—Mitchell A. Smolow

(57) ABSTRACT

An energy savings circuit comprising a means for receiving an ac voltage source; a first voltage storage device in series with the ac voltage source; a second voltage storage device electrically connected to the ac voltage source; a third voltage storage device in series with the ac voltage source; a fourth voltage storage device in series with the second voltage storage device and electrically connected to the ac voltage source; a fifth voltage storage device electrically connected to the second and fourth voltage storage devices; and a means for discharging the fifth voltage storage device into a load. After receiving a first charge each, the first voltage storage device, in combination with the ac voltage source, supplies a charge to the second voltage storage device and the third voltage storage device, in combination with the ac voltage source, supplies a charge to the fourth voltage storage device. Thereafter, the second and fourth voltage storage devices supply a charge to the fifth voltage storage device.

25 Claims, 4 Drawing Sheets

WATT POWER DEVICE

FIELD OF THE INVENTION

This invention relates to electric power delivery in general, and in particular, to savings which may be achieved with power delivery systems.

BACKGROUND OF THE INVENTION

Reducing the power loss in electric loads has been a focus of much development for some time. While early work focused on power transmission losses, more recent developments have also addressed power losses in 220 volt and 110 volt residential and commercial site load networks.

Power efficiency meters connected between a utility metering device and a residential or commercial load can measure the power loss or efficiency of such a site load network. One method described to reduce power loss has been to alter the sinusoidal shape of the 60 cycle voltage supplied by a utility company. The object of such previous work was to reduce the transition time of the voltage from half peak value to half peak value. This was done with 110 volt or 220 volt power supplies connected between a utility metering device and an electric load.

For example, an energy savings device power supply having an internal dc battery is disclosed in U.S. Pat. No. 3,319,074. An external ac source is rectified and applied to a load under control of a transistor. The dc battery compensates for fluctuations of the ac power source is maintained in a fully charged condition. However, one problem with operation of this energy savings device is that while the power supply is designed to maintain a constant voltage on the load, the power supply also introduces additional power losses. Nor does it cope with the varying demands of ac loads, insofar as efficient supply of energy is concerned.

U.S. Pat. No. 4,206,367 to Petruska, et al. discloses a 220 volt power supply having an internal dc battery and a charge/discharge circuit. The energy savings device operates to reduce the power drawn from the utility company supplied external ac source while servicing the residential load. The device is constructed to provide a continuous sinusoidal wave through opposite phase coupled dc batteries. However, because of the inherent delays in the batteries, only an approximated sinusoidal waveform is achieved which is not sufficient to power the electric motors and power supplies of modern equipment used in residences and businesses.

The Petruska energy savings device is a 220 volt device which is intended to be connected between the utility power metering device and the residential circuit breaker box. A power consumption meter is a 220 volt device which is intended to be connected between the utility power metering device and the Petruska energy savings device. Residential use, while sometimes at 220 volts for appliances such as electric ranges and clothes dryers, is primarily delivered at 110 volts. This is accomplished by splitting a three-wire 220 volt supply line into two, two-wire 110 volt subcircuits in the residential distribution box; i.e., the circuit breaker box.

Use of circuitry such as the Petruska power supply, in cooperation with electrical loads, has resulted in the increased use of power consumption metering of the power supplied by public utilities to their customers. However, these power use meters are often unable to accurately measure energy savings actually being attained. Most (if not all) power consumption meters measure 220 volt current usage across the load to calculate residential power consumption at both 220 volts and 110 volts, often resulting in an error in calculating the true power consumption.

One method of improving the actual, real time measurement of the power consumption is through use of the error compensating circuit described in U.S. Pat. No. 5,319,300 to Wood. Wood discloses an error compensation or correction circuit comprising a pair of capacitors straddling a third capacitor or a rechargeable battery source and uses switching transistors to apply an instantaneous voltage level corresponding to the sinusoidal ac supply voltage by controlling the charging and discharging of the voltage storage elements (i.e. the capacitors and battery). This results in an applied reverse current flow to the power metering device furnished by the power company which corrects the power consumption measurement of the metering devices attached across the electrical load.

Such a residential power consumption meter is connected directly to the utility power metering device and uses the 220 volt power supplied at that point to calculate and record (by magnetic rotating dial and hand pointers) the power consumption of the customer.

The ability of circuits such as the Petruska energy savings device to react to changes in current demand is severely limited by the voltage storage devices' (i.e. the batteries) slow response times. The Wood patent substitutes for these devices voltage storage elements with faster response times (i.e. capacitors) which achieve a significant reduction in response time resulting in a more accurate error compensation for the instantaneous current draw. However, due to the continued use of the complex circuitry arrangement which included, for example, complimentary and opposing current flow compensation circuits, the instantaneous result did not produce the desired pure sinusoidal waveform.

U.S. Pat. No. 5,637,989 to Wood discloses an electrical power energy savings circuit for use with 220 volt ac power delivery systems for reducing the power drain of the power delivery system during the "off phase" for each of the 110 volt legs of the ac power supply circuit as measured across the load. However, this circuit is required to be attached to each 110 volt leg of a 220 volt ac supply line. Additionally, a voltage delay elimination means is required to provide a current demand following device to constantly monitor the load so that the half wave produced from the dc voltage storage device is triggered at the appropriate instant in time. Otherwise, an offset or delay could occur in the sinusoidal waveform applied to the load, damaging ac motors and other similar devices.

In response to these problems, Wood further disclosed in U.S. Pat. No. 6,215,203 a power supply circuit utilizing an ac power source, voltage storage device (capacitor), and switching device (transistor and transformer) to produce a complete sinusoidal waveform instantly to a load. However, the use of these transformers and transistors consumed power that might otherwise have been utilized more efficiently.

Accordingly, there remains a continuing need for a more simplified electrical power energy savings circuit that can utilize the sinusoidal wave form supplied by the power company more efficiently. The present invention fulfills this need, and further provides related advantages.

SUMMARY OF INVENTION

In view of the shortcoming of the prior art, the energy savings circuit of the present invention provides more efficient use of the complete input ac sine wave. The energy savings circuit is implemented in combination with an ac source of voltage, an optional electrical power metering means, an associated electrical load, and an optional dc to ac inverter for use with loads requiring alternating current.

The circuit comprises a means for receiving the ac voltage source; a first voltage storage device in series with the ac voltage source; a second voltage storage device electrically connected to the ac voltage source; a third voltage storage device in series with the ac voltage source; a fourth voltage storage device in series with the second voltage storage device and electrically connected to the ac voltage source; a fifth voltage storage device electrically connected to the second and fourth voltage storage devices; and a means for discharging the fifth voltage storage device into a load.

After receiving a first charge each, the first voltage storage device, in combination with the ac voltage source, supplies a charge to the second voltage storage device and the third voltage storage device, in combination with the ac voltage source, supplies a charge to the fourth voltage storage device. Thereafter, the second and fourth voltage storage devices supply a charge to the fifth voltage storage device.

In a second embodiment, the circuit further includes a sub-circuit for creating a square wave form from the ac voltage source while at the same time producing additional power savings. The sub-circuit comprises a means for receiving the ac voltage source; a first sub-circuit voltage storage device in series with the ac voltage source; a second sub-circuit voltage storage device electrically connected to the ac voltage source; a third sub-circuit voltage storage device in series with the ac voltage source; a fourth sub-circuit voltage storage electrically connected to the ac voltage source; a first switching control electrically connected to the second sub-circuit voltage storage device; and a second switching control electrically connected to the fourth sub-circuit voltage storage device.

After receiving a first charge each, the first sub-circuit voltage storage device, in combination with the ac voltage source, supplies a charge to the second sub-circuit voltage storage device and the third sub-circuit voltage storage device, in combination with the ac voltage source, supplies a charge to the fourth sub-circuit voltage storage device. The first switching control and second switching control are synchronized such that when one is on, the other is off; thereby creating a square wave.

In yet another embodiment, a dc to ac inverter is included.

In still another embodiment, an error correction circuit is included between the electrical power metering means and the improved power supply circuit of the present invention such that the electrical power metering means measures power usage in direct proportion to the actual electrical load.

One object of the present invention is to incorporate such an improved energy savings circuit into a residential power supply.

Yet another object of the present invention is to incorporate the improved energy savings circuit within the load.

Still another object of the present invention is to incorporate the improved energy savings circuit within a device positioned between the residential power supply and the load.

Furthermore, the present invention is intended to optionally provide a direct current to the load.

The present invention is intended to be used with any input source ac voltage, but in particular, with an input source ac voltage of approximately 100 to approximately 900 volts ac, and more particularly of approximately 110, 220, 240, 440 or 480 volts ac.

Other aspects of the present invention will be apparent from the following more detailed description of the preferred embodiments, in conjunction with the accompanying drawings which illustrate, by way of example, the principles of the invention.

BRIEF DESCRIPTION OF DRAWINGS

For the purpose of illustrating the invention, there is shown in the drawings forms which are presently preferred; it being understood, however, that the invention is not limited to the precise arrangements and instrumentalities shown.

The various features and advantages of the present invention may be more readily understood with reference to the following detailed description taken in conjunction with the accompanying drawings.

DETAILED DESCRIPTION

The present invention is described for use with standard 220 VAC input into a residential power metering device. However, the description is not intended in a limiting sense, and is made solely for the purpose of illustrating the general principles of the invention. In particular, while 220 VAC input is used as an exemplar, the present invention is envisioned for use without limitation to a specific VAC.

While the capacitors described below reach full charge nearly instantaneously, in the following description the charging of the capacitors is spread out over a period of time so that a step-by-step analysis can be shown. Furthermore, as an aid to readability, voltages will be described as a fixed value. However, it should be understood that in practice they represent an approximate voltage range. For example, when a voltage of 220 VAC is indicated as being delivered by the power company, in practice, the voltage actually delivered may vary approximately 1 to 2 percent. Other voltages used in the description are commensurate approximations of ranges of VAC. Furthermore, it should be understood that using a variable transformer (variac) will allow for "fine tuning" of the input VAC to achieve the desired output voltage.

Figure 1:
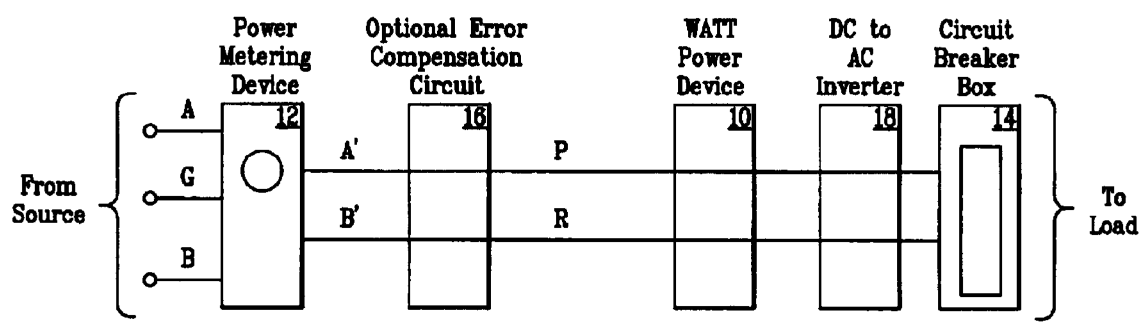
FIG. 1 is a representative block diagram of the electrical power delivery circuit to a residence or commercial establishment including the improved power supply circuit of the present invention.

Referring now to the drawings in detail, in a first embodiment, there is shown in FIG. 1 the improved energy savings circuit, which is identified, generally, as 10. The energy savings circuit 10 is interposed between the utility power metering device 12 and the residential or commercial circuit breaker box (i.e. the load network) 14. Optionally, the energy savings circuit 10 can follow an error compensation circuit 16. The circuit breaker box 14 connects to a variety of individual electrical loads situated within the residential or commercial site, the connections to which are not shown. Also, the power supply source which is to the power metering device 12 is indicated only by entry feed lines, A, B and G. The proposed connections and specific usages are described in greater detail below.

With reference to FIG. 1, the energy savings circuit 10 can be described as follows. The external power source from the utility company is delivered to most residential and commercial properties in a 3-wire system carrying 220 volts ac across the two feed lines A, B, with the third line G being neutral. Such wire delivery system usually comes from a step-down transformer (not shown) connected to the utility company power distribution net. At the entrance to the property receiving the power delivery, the utility company terminates its lines in a power metering device such as the meter box 12 of FIG. 1. Exiting the meter box 12 on the private property side of the box is a 3-wire system delivering 220 volts ac as measured between two of its legs A', B' with the third leg G' being ground.

An error compensation circuit 16 may be placed following the power metering device 12 to appropriately monitor actual power usage and reflect the unnecessary current so that the power metering device registers only the actual power consumed. The functioning of such an error compensation circuit is more fully set forth in the Wood U.S. Pat. No. 6,215,203. If used, the error compensation circuit produces a 60 Hz 110 ac sinusoidal voltage across the output terminals P, R and that voltage is applied to the input terminals of the energy savings circuit 10 of the present invention.

If an error compensation circuit is not utilized, then the input terminals of the energy savings circuit 10 can be connected across the incoming power supply of the residential/commercial power delivery system entering the property.

Figure 2:
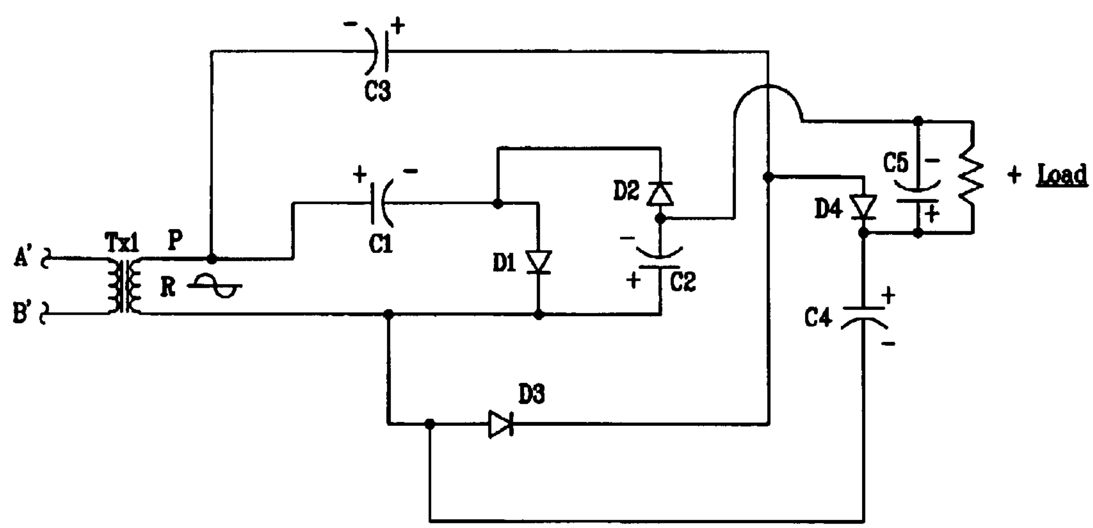
FIG. 2 is a schematic diagram of the improved power supply circuit of a first embodiment of the present invention.

Referring to FIG. 2, in which the optional error compensation circuit 16 is omitted, transformer TX1 has its primary winding connected across the A' and B' legs of the power source so that 220 volts ac is applied across the input terminals of its primary winding. The secondary winding, is 55 volts ac. Transformer TX1 is employed to step down the 220 VAC provided by power supply lines A' and B' from power metering device 12 to 55 VAC, exiting the transformer TX1 at supply lines P and R, respectively. Alternatively, transformer TX1 may be a variac.

The circuit elements of energy savings circuit 10 are all indicated by standard symbols. The specific functioning of the circuit elements is as follows. During the first half-phase of a single cycle of the alternating current, when P goes positive (R goes negative), the positive half of the ac sine wave from transformer TX1 causes capacitor C1 to charge to the 55 volts dc peak value of the secondary of transformer TX1. The capacitor C1, like all of the capacitors described in connection with the energy savings circuit 10 is rated at 400 volts dc, 10,000 Î¼f.

During the second half-phase of the single cycle of the alternating current, when R goes positive (P goes negative), the positive half of the ac sine wave from transformer TX1 causes capacitor C2 to charge to the 55 volts dc peak value of the secondary of transformer TX1. In addition, because capacitor C1 is in series with transformer TX1, capacitor C2 receives an additional 55 volts dc from capacitor C1 through diode D1, thereby giving capacitor C2 a total charge of 110 volts dc. Diode D1, like all of the diodes described in connection with the energy savings circuit 10, is rated at 600 volts, 1 amp.

Simultaneously during the second half-phase of the single cycle of the alternating current, when R goes positive (P goes negative), the positive half of the ac sine wave from transformer TX1 through diode D3 causes capacitor C3 to charge to the 55 volts dc peak value of the secondary of transformer TX1.

Also simultaneously during the second half-phase of the single cycle of the alternating current, when R goes positive (P goes negative), the positive half of the ac sine wave from transformer TX1 through diodes D3 and D4 causes capacitor C4 to charge to the 55 volts dc peak value of the secondary of transformer TX1. In addition, because capacitor C3 is in series with transformer TX1, capacitor C4 receives an additional 55 volts dc from capacitor C3 through diodes D3 and D4, thereby giving capacitor C4 a total charge of 110 volts dc.

Capacitors C2 and C4, which are in series, charge capacitor C5 with their respective 110 volt dc charges, thereby giving capacitor C5 a total charge of 220 volts dc. Because power to the load is delivered by capacitor C5, the current draw from the power supply is only one fourth of the secondary output current of transformer TX1.

Optionally, a dc to ac inverter (18, FIG. 1) may be placed following capacitor C5 to power an ac load, or alternatively, capacitor C5 is used to directly power a dc load.

Figure 3:
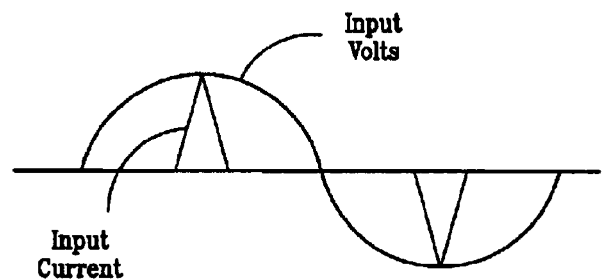
FIG. 3 is a representation of the supply power sine wave.

The energy savings created by the present invention is derived from more efficient use of the complete input sine wave. FIG. 3 shows the input sine wave as depicted on an oscilloscope. Because capacitors C1 through C5 do not completely discharge their stored charge, for capacitor C1 and the transformer to charge capacitor C2, capacitor C3 and the transformer to charge capacitor C4, and capacitors C2 and C4 to charge capacitor C5, the input current from the input power supply need flow during only approximately one quarter of the positive half input wave and one quarter of the negative half input wave. As a result, bench tests have shown the total power savings to be at least 50 percent.

Figure 4:
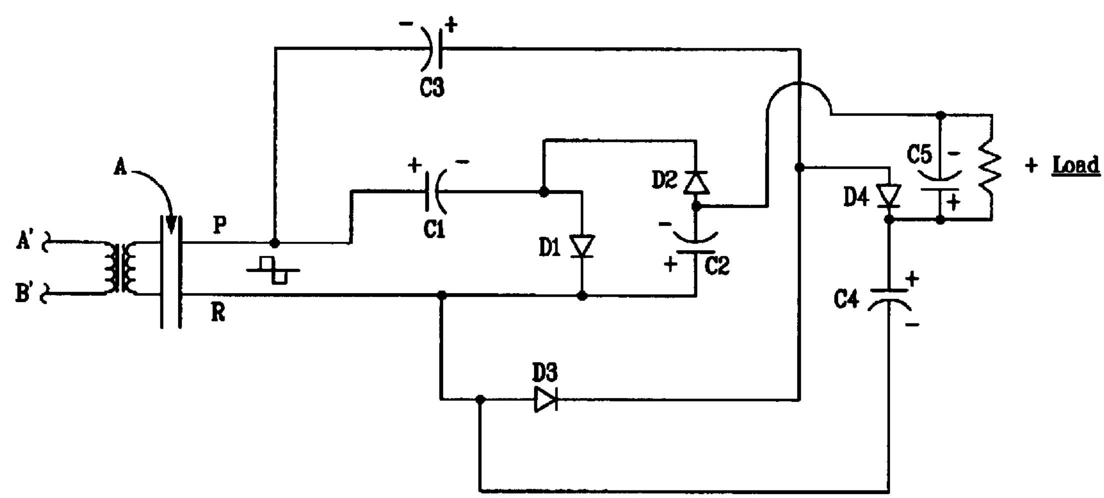
FIG. 4 is a schematic diagram of the improved power supply circuit of a second embodiment of the present invention.
Figure 5:
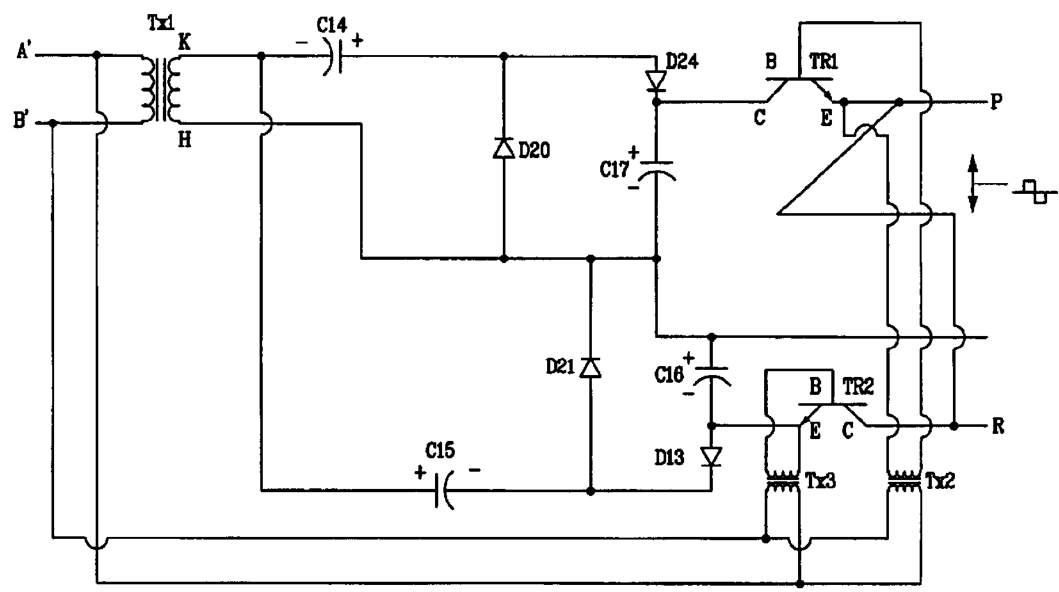
FIG. 5 is a schematic diagram of the sub-circuit "A" of FIG. 4.

In a second embodiment, sub-circuit 20 represented in FIG. 5 is inserted at position A of FIG. 4. Transformer TX1 secondary winding, is at 27.5 volts ac. Transformer TX1 is employed to step down the 220 VAC, exiting the transformer TX1 at supply lines K and H, respectively. During the first half-phase of a single cycle of the alternating current, when K goes positive (H goes negative), the positive half of the ac sine wave from transformer TX1 causes capacitor C15 to charge to the 27.5 volts dc peak value of the secondary of transformer TX1.

During the second half-phase of the single cycle of the alternating current, when H goes positive (K goes negative), the positive half of the ac sine wave from transformer TX1 through diode D20 causes capacitor C14 to charge to the 27.5 volts dc peak value of the secondary of transformer TX1.

Simultaneously, the positive half of the ac sine wave from transformer TX1 causes capacitor C16 to charge to the 27.5 volts dc peak value of the secondary of transformer TX1. In addition, because capacitor C15 is in series with transformer TX1, capacitor C16 receives an additional 27.5 volts dc from capacitor C15 through diode D21, thereby giving capacitor C16 a total charge of 55 volts dc.

Simultaneously during the first half-phase of the single cycle of the alternating current, when K goes positive (H goes negative), the positive half of the ac sine wave from transformer TX1 through diode D24 causes capacitor C17 to charge to the 27.5 volts dc peak value of the secondary of transformer TX1. In addition, because capacitor C14 is in series with transformer TX1, capacitor C17 receives an additional 27.5 volts dc from capacitor C14 through diodes D20 and D24, thereby giving capacitor C17 a total charge of 55 volts dc.

Transformers TX2 and TX3 have their primary winding connected across the A' and B' legs of the power source, so that approximately 220 volts ac is applied across the input terminals of its primary winding. The secondary winding, which is approximately three volts ac controls its associated transistor, TR1 and TR2, respectively. Transistors TR1 and TR2 act merely as switchable controls for the period when each of the capacitors C16 and C17 will discharge current. The leads of transformers TX2 and TX3 are connected to A' and B' legs of the power source so that their secondary outputs are out of phase respective to one another. In this manner, sub-circuit 20 creates a square wave. By utilizing the complete sine wave more efficiently (as explained above), sub-circuit 20 produces an additional 20 percent power savings.

The square wave produced by sub-circuit 20 is presented to the energy savings circuit 10 and is thereafter treated in the same manner as the sine wave described above. Sub-circuit 20 is particularly useful when energy saving circuit 10 is used in combination with a dc to ac inverter. The additional 20 percent power savings produced by sub-circuit 20 compensates for the power draw utilized by the dc to ac inverter.

The use of the energy savings circuit 10, with or without sub-circuit 20 greatly reduces the power drain as measured across the load. The currently described energy savings circuit 10 provides its energy output without the need for a voltage delay elimination means or for independent power sources or batteries which act as current collection or storage devices. Instead, the energy savings circuit 10 of the present invention significantly reduces the necessary elements and control circuit elements.

The energy savings circuit 10 provides pure dc voltage and pure dc current. In combination with a dc to ac inverter 18, the energy savings circuit 10 produces a consistent symmetrical sinusoidal waveform at the load connection points. The energy savings circuit 10 in combination with a dc to ac inverter further provides a smooth, fully symmetrical sinusoidal waveform with no time delay between the positive half and the negative half of the resulting sinusoidal waveform across the load.

Therefore, use of the electrical power consumption energy savings circuit 10 of the present invention will yield energy savings and, when used with an error compensation circuit, a more accurate residential/commercial power consumption measurement by a 220 volt electrical power consumption meter.

While the energy savings circuit 10 of the present invention has been described in a location between the power metering device 12 and the circuit breaker box 14, thereby reducing the power drain globally, it is also within the scope of the present invention to reduce the power drain on an individual basis for any given load. For example, the energy savings circuit 10 may be incorporated within the load, for example, an individual appliance, or it may be incorporated within a stand alone device positioned between the circuit breaker box 14 and the load, for example, an freestanding unit or an electrical outlet.

The present invention may be embodied in other specific forms (in particular, at differing input power supply voltages) without departing from the spirit or essential attributes thereof and, accordingly, the described embodiments are to be considered in all respects as being illustrative and not restrictive, with the scope of the invention being indicated by the appended claims, rather than the foregoing detailed description, as indicating the scope of the invention as well as all modifications which may fall within a range of equivalency which are also intended to be embraced therein.

Although the present invention has been described with reference to, exemplary embodiments, it is not limited thereto. Rather, the appended claims should be construed to include other variants and embodiments of the invention which may be made by those skilled in the art without departing from the true spirit and scope of the present invention.

What is claimed is:

1. A power supply circuit for conducting current from an ac voltage source to an associated electrical load comprising:

means for receiving the ac voltage source;

a first voltage storage device in series with the ac voltage source;

a second voltage storage device electrically connected to the ac voltage source;

a third voltage storage device in series with the ac voltage source;

a fourth voltage storage device in series with the second voltage storage device and electrically connected to the ac voltage source;

a fifth voltage storage device electrically connected to the second and fourth voltage storage devices; and means for discharging the fifth voltage storage device into a load;

wherein after receiving a first charge, the first voltage storage device, in combination with the ac voltage source, supplies a charge to the second voltage storage device;

after receiving a first charge, the third voltage storage device, in combination with the ac voltage source, supplies a charge to the fourth voltage storage device; and after receiving a charge each, the second and fourth voltage storage devices supply a charge to the fifth voltage storage device.

2. The power supply circuit of claim 1 wherein the charge to the second voltage storage device is about double the first charge, the charge to the fourth voltage storage device is about double the first charge, and the charge to the fifth voltage storage device is about four times the first charge.

3. The power supply circuit of claim 1 wherein the voltage storage devices are capacitors.

4. The power supply circuit of claim 1 wherein the means for discharging the fifth voltage storage device into a load is a dc to ac inverter.

5. The power supply circuit of claim 4 wherein the power supply circuit is incorporated within an electrical outlet.

6. The power supply circuit of claim 1 wherein the means for discharging the fifth voltage storage device into a load is a dc to ac inverter in combination with a circuit breaker box.

7. The power supply circuit of claim 1 wherein the power supply circuit is incorporated within the load.

8. The power supply circuit of claim 1 wherein the power supply circuit is in combination with an error compensation circuit.

9. The power supply circuit of claim 1 wherein the means for receiving the ac voltage source is a sub-circuit producing a square wave.

10. The power supply circuit of claim 9 wherein the sub-circuit comprises:

means for receiving the ac voltage source;

a first sub-circuit voltage storage device in series with the ac voltage source;

a second sub-circuit voltage storage device electrically connected to the ac voltage source;

a third sub-circuit voltage storage device in series with the ac voltage source;

a fourth sub-circuit voltage storage electrically connected to the ac voltage source;

a first switching control electrically connected to the second sub-circuit voltage storage device; and a second switching control electrically connected to the fourth sub-circuit voltage storage device;

wherein after receiving a first charge, the first sub-circuit voltage storage device, in combination with the ac voltage source, supplies a charge to the second sub-circuit voltage storage device;

after receiving a first charge, the third sub-circuit voltage storage device, in combination with the ac voltage source, supplies a charge to the fourth sub-circuit voltage storage device; and the first switching control and second switching control are synchronized such that when one is on, the other is off.

11. The power supply circuit of claim 10 wherein the first and second switching control each comprise a transformer coupling the ac voltage source to a switch for switching the switching control to its conducting condition.

12. The power supply circuit of claim 11 wherein the switch is a transistor.

13. The power supply circuit of claim 10 wherein the charge to the second sub-circuit voltage storage device is about double the first charge and the charge to the fourth sub-circuit voltage storage device is about double the first charge.

14. The power supply circuit of claim 10 wherein the sub-circuit voltage storage devices are capacitors.

15. A method for producing increased energy savings comprising the steps of:

electrically connecting an ac voltage source to an energy savings circuit; and electrically connecting the energy savings circuit to a load;

wherein the energy savings circuit includes means for receiving the ac voltage source;

a first voltage storage device in series with the ac voltage source;

a second voltage storage device electrically connected to the ac voltage source;

a third voltage storage device in series with the ac voltage source;

a fourth voltage storage device in series with the second voltage storage device and electrically connected to the ac voltage source;

a fifth voltage storage device electrically connected to the second and fourth voltage storage devices; and means for discharging the fifth voltage storage device into a load;

wherein after receiving a first charge, the first voltage storage device, in combination with the ac voltage source, supplies a charge to the second voltage storage device;

after receiving a first charge, the third voltage storage device, in combination with the ac voltage source, supplies a charge to the fourth voltage storage device; and after receiving a charge each, the second and fourth voltage storage devices supply a charge to the fifth voltage storage device.

16. The method of claim 15 wherein the charge to the second voltage storage device is about double the first charge, the charge to the fourth voltage storage device is about double the first charge, and the charge to the fifth voltage storage device is about four times the first charge.

17. The method of claim 15 wherein the voltage storage devices are capacitors.

18. The method of claim 15 wherein the means for discharging the fifth voltage storage device into a load is a dc to ac inverter.

19. The method of claim 15 wherein the means for receiving the ac voltage source is a sub-circuit producing a square wave.

20. The method of claim 19 wherein the sub-circuit comprises:

means for receiving the ac voltage source;

a first sub-circuit voltage storage device in series with the ac voltage source;

a second sub-circuit voltage storage device electrically connected to the ac voltage source;

a third sub-circuit voltage storage device in series with the ac voltage source;

a fourth sub-circuit voltage storage electrically connected to the ac voltage source;

a first switching control electrically connected to the second sub-circuit voltage storage device; and a second switching control electrically connected to the fourth sub-circuit voltage storage device;

wherein after receiving a first charge, the first sub-circuit voltage storage device, in combination with the ac voltage source, supplies a charge to the second sub-circuit voltage storage device;

after receiving a first charge, the third sub-circuit voltage storage device, in combination with the ac voltage source, supplies a charge to the fourth sub-circuit voltage storage device; and the first switching control and second switching control are synchronized such that when one is on, the other is off.

21. The method of claim 20 wherein the first and second switching control each comprise a transformer coupling the ac voltage source to a switch for switching the switching control to its conducting condition.

22. The method of claim 21 wherein the switch is a transistor.

23. The method of claim 20 wherein the charge to the second sub-circuit voltage storage device is about double the first charge and the charge to the fourth sub-circuit voltage storage device is about double the first charge.

24. The method of claim 20 wherein the sub-circuit voltage storage devices are capacitors.

25. The method of claim 15 further including the step of electrically connecting an error compensation circuit between the ac voltage source and the energy savings circuit.

* * * * *